Aug. 10, 1926.

W. H. COLLINS 1,595,758

ANIMAL FEEDING DEVICE

Filed May 17, 1922  2 Sheets-Sheet 1

INVENTOR
W. H. Collins
BY John D. Morgan
ATTORNEY

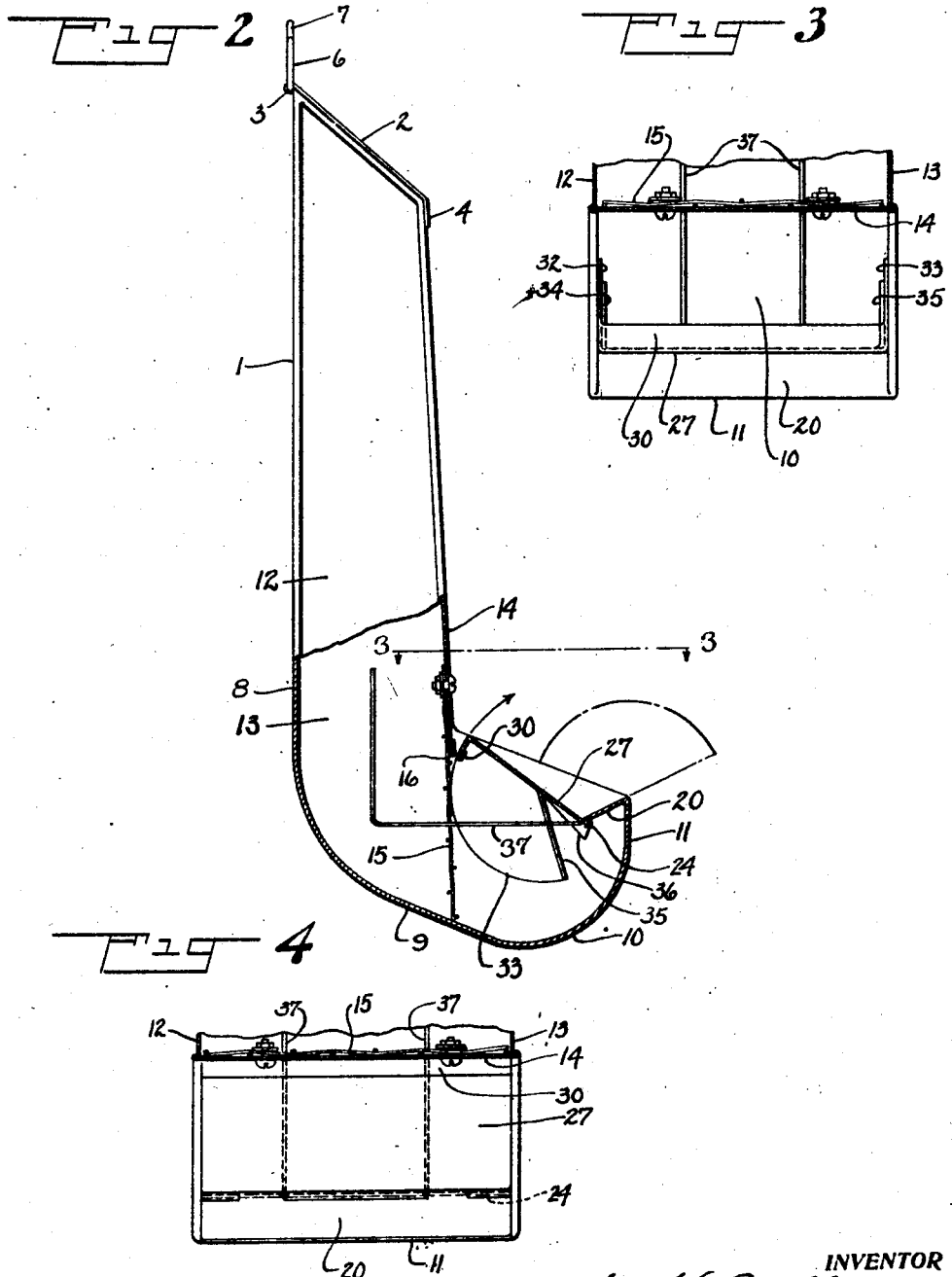

Patented Aug. 10, 1926.

1,595,758

UNITED STATES PATENT OFFICE.

WALTER H. COLLINS, OF SUMMIT, NEW JERSEY.

ANIMAL-FEEDING DEVICE.

Application filed May 17, 1922. Serial No. 561,759.

The invention relates to feeding devices for chicks and other animals, and more especially to novel features in a novel closure and waste preventing devices in such a feeding device.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 2 is a side elevation, with parts in section, and parts broken away, looking at Fig. 1 obliquely from the left;

Fig. 3 is a fragmentary section, taken on the line 3—3 of Fig. 2 with the parts in the position of Fig. 1; and Fig. 4 is a similar view with the parts in the position of Fig. 2.

Figure 1:
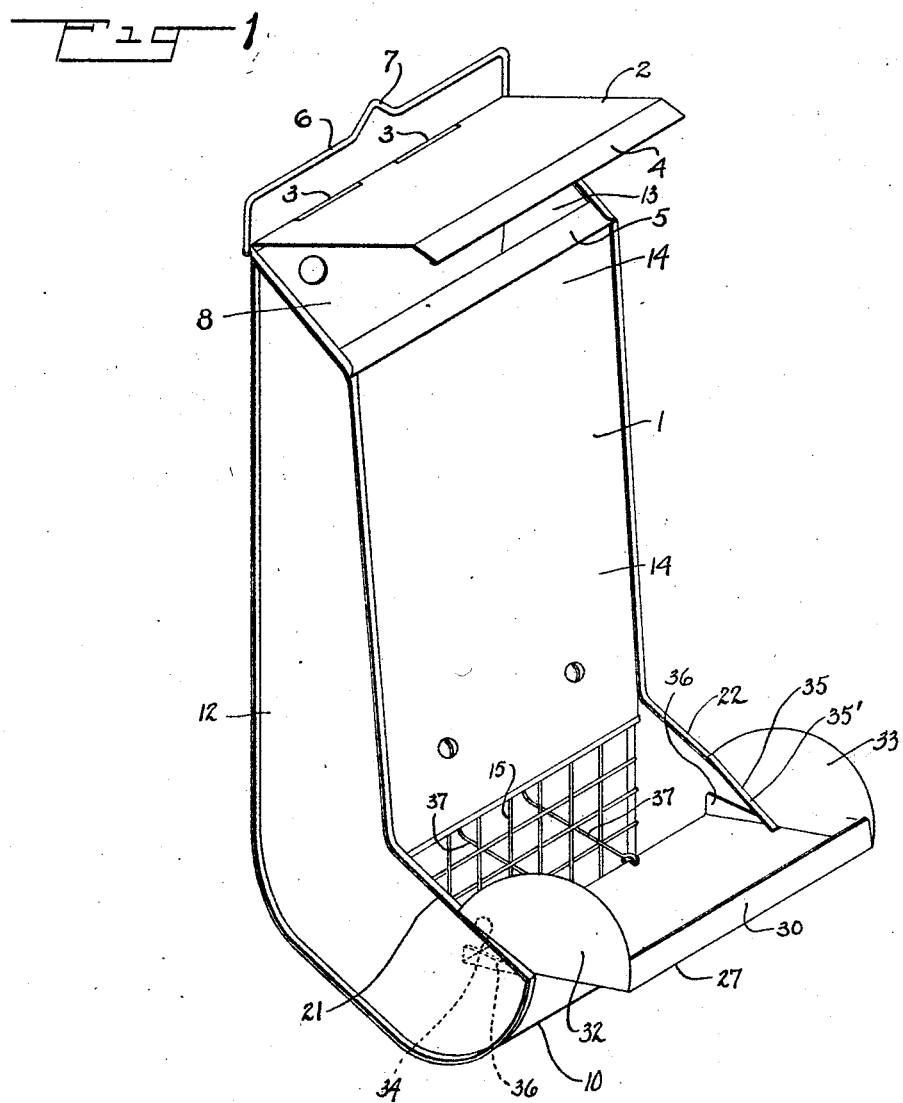
Fig. 1 is a perspective of a feeding device embodying the invention.

The invention is directed primarily to providing a combined closure and guard against vermin or other predatory or undesirable creatures and preventing waste in feeding. It is applied, preferably to a feeder having a magazine or reserve feed supply from which the feeding bowl or trough is automatically replenished, the closure and guard locking automatically in the open position, so that it will remain in the waste-preventing position as long as the feeder is open or accessible for feeding.

As embodied in the present preferred exemplary form herewith illustrated, the invention is shown applied to a magazine feeder for chickens and other fowl, which is also adaptable to other animals. The feeding device is provided with a vertically disposed body 1, of sheet metal or other suitable material and a downwardly and forwardly inclined bottom end, which is open at the top thereof, with this opening preferably forwardly and downwardly inclined, to form a feeding bowl or trough. The closure and guard is applied to this top opening of this trough or bowl part, through which the fowls or other animals feed.

The feed is introduced into the feeder at the top thereof, through a door or lid 2, shown having hinges 3 at the rear, and a bent or angled lip 4 across the front end thereof, resting upon and fitting over a similar lip 5 formed at the upper edge of the front wall 14 of the body 1 of the magazine.

The entire feeding device is supported in any suitable manner, and is shown provided for this purpose with a bail 6, attached to the rear of the upper edge of the back wall 8 of the body of the feeder, and the bail may have an angled part 7 to hang over a hook or nail or other suitable projection.

The forward bottom part, constituting the feeding trough or bowl, is preferably formed as a continuation of the backwall and sidewalls of the body or magazine portion of the feeder. As embodied, the lower end of the back wall 8 of the body is sloped or inclined downwardly and forwardly as shown at 9. It is then bent curvedly forwardly and upwardly to constitute the bottom of the dished or hollow part 10, and is then curved upwardly in the part 11. The lowermost point of the feed trough to which the feed gravitates is in front of the vertical wall of the magazine, and thus the last particle of feed is readily accessible.

The two sidewalls 12 and 13 of the body or magazine of the feeder are shaped to extend downwardly and forwardly to form the sides of this forwardly and downwardly extending bowl or trough-like part just described, which provides the feeding space for the animals. The present preferred form of these parts will be clear from Figs. 1 and 2.

Suitable means are provided for permitting by the action of gravity a gradual and controlled supply of the feed from the body of the magazine downwardly and forwardly into the bowl or trough 10. As embodied, a barrier or partition 15 of large wire mesh fills the opening between the lower horizontal edge 16 of the front 14 of the body of the magazine and the forwardly and downwardly sloped part 9 of the back of the magazine. This is a very coarse mesh or grating, usually, as will be seen from Figs. 1 and 2.

The embodied form of closure provided by the present invention is constructed and arranged to remain firmly in the closed position, or to automatically lock in the open position by merely being moved or pulled from one position to the other. In the closed position it excludes insects, vermin and the like and in the open position it constitutes a guard against the spilling of the feed, as any feed taken by the chickens or other animals and dropped is deflected and directed, or is retained and finally dumped, by this closure and guard, during the closing movement, back into the bowl 10.

As embodied, the upper end of the wall 11 is bent inwardly and downwardly to constitute a flange 20, extending across between the inclined upper parts 21 and 22 of the side-walls 12 and 13. The top edges of the parts 21 and 22 are preferably finished off with flat or angled edges, as will appear from Figs. 1, 3 and 4.

The embodied mounting for the closure guard comprises a rod 24 extending across between and supported by the downwardly and forwardly extending parts 21 and 22 of the side walls 13 and 14. The closure and guarding member consists of a body 27, preferably of sheet metal, which is hinged by having its edge turned about the rod 24, so that it forms at the hinge a continuous closure with the flange 20 of the front wall feeding bowl.

At its other or outer edge, the closure and guard member 27 has a lip or flange 30, preferably substantially at right angles with the body 27 of the closure and guard. In the closed position this fits snugly within the lower horizontal edge of the front plate 14 of the body as shown in Fig. 2. When in the open position, as appears from Fig. 1, it constitutes a curb or barrier at the front or outside of member 27 for the food which may be dropped upon the guard by the animals, so that it will be retained on the guard and will slide back into the bowl, or will be dumped back within the feeding bowl when the closure guard is moved to the closed position.

At its sides the closure guard is provided with spring side walls which act as a part of the guard or container for the feed and also constitute the automatic locking device. As embodied, the integral sides of the part 27 are bent at right angles, as best shown at 32 and 33 in Figs. 1 and 2, these parts having curved or arcuate peripheries extending from the front of the member 27 and the curb or guard 30 inwardly or backwardly.

At their inner sides these members 32 and 33 are formed to have spring action and are cut away sharply backwardly at 34 and 35 so that in the open position these edges will conform to and will spring out over and will rest upon the edges of the side walls 21 and 22. The edges of parts 34 and 35 are preferably bent at right angles, as best shown at 35' in Fig. 1 to form a seat on the similarly formed edges of the side walls 21 and 22.

The metal of the parts 32 and 33 is bent to have a spring action, as stated, so that when the closure guard is opened to the position of Fig. 1, the flanges 34 and 35 will automatically spring outwardly over the edges 21 and 22 of the side wall and will maintain the closure guard in the open position. When it is desired to close the guard, the members 32 and 33 are pushed slightly inwardly, whereupon they will pass within the side walls 12 and 13. The closure guard forwardly or inwardly of the parts 34 and 35 is provided with angled guiding pieces 36. When the closure guard 27 is in the open position (as shown in Fig. 1 and by the broken line in Fig. 2) it rests upon the flange or shelf 20 and with the sides 33 and 34 sprung over and resting upon the top edges of the sides 21 and 22 of the body of the device, the closure is held immovably in the open position until the sides 33 and 34 are pushed inwardly. This permits the closure guard to be moved to the full line position of Fig. 2 when it completely closes the feed opening, as shown in Fig. 2.

Stirrers 37 are preferably provided, hinged on the rod 24 and projecting forwardly horizontally through the wire mesh 15 and then projecting upwardly into the body of the magazine.

It will be understood that changes may be made from the exact structures herein shown and described, that departures may be made therefrom within the scope of the accompanying claims without departing from the principles of the invention and without sacrificing its chief advantages.

What I claim is:—

1. A feeding device including in combination a feed magazine with an outwardly projecting feeding bowl at the bottom thereof, open at the top for access, and having a flange across the front side of said opening, and a closure guard mounted to move to one position to close said opening and to another position supported on said flange to guard against dropping the feed, and yielding means operating automatically to hold it positively in open position.

2. A feeding device including in combination a feed magazine with an outwardly projecting feeding bowl at the bottom thereof, open at the top for access, and a cover member movable to close the feeding bowl or to form a guard against dropping the feed when in the open position, and a stirring rod within the device mounted near the front and bottom thereof and bent upward to extend upwardly into the body of the magazine and accessible through said opening, said cover member having yielding side portions adapted to spring over the edges of said projecting feeding bowl.

3. A feeding device comprising a vertically disposed magazine, a feeding bowl in communication with the lower end thereof, and a cover pivoted on the feeding bowl and having outwardly and laterally resilient side elements which serve to lock the cover in open position.

4. A feeding device including in combination a feed magazine having a substantially vertical front wall with an outwardly projecting feeding bowl at the bottom thereof open at its top for access, the feeding bowl being located in front of the front wall of the feed magazine, and a member movable to close said opening or to form a guard against dropping the feed when in open position, having spring acting sidewalls for automatically operating to hold said member in the open position and for preventing the lateral spilling of the feed.

5. A feeding device, comprising a vertically extending magazine, a feeding bowl at the lower end of the magazine extending outwardly therefrom and located in front of the front vertical wall thereof, and a member pivoted to the feeding bowl for closing the feeding bowl in one position and for forming a guard against dropping of the feed when in open position, said member having yielding side portions adapted to engage said feeding bowl frictionally and to spring over said feeding bowl and hold said member positively fixed in open position.

In testimony whereof, I have signed my name to this specification.

WALTER H. COLLINS.